United States Patent [19]

Zia et al.

[11] Patent Number: 5,242,056
[45] Date of Patent: Sep. 7, 1993

[54] PORTABLE OFFICE

[76] Inventors: Farrukh Zia; Henri Galina-Rosin, both of 17899 S. Susana Rd., Rancho Dominguez, Calif. 90221

[21] Appl. No.: 849,624

[22] Filed: Mar. 9, 1992

[51] Int. Cl.$^5$ .......................... A45C 3/02; B65D 85/68
[52] U.S. Cl. .................................... 206/576; 190/110; 190/119; 206/320
[58] Field of Search ............... 206/214, 223, 320, 576; 190/16, 17, 31, 35, 109, 115, 119; 400/613.2, 685

[56] References Cited

U.S. PATENT DOCUMENTS

| | | | |
|---|---|---|---|
| 522,237 | 7/1894 | Sexton | 190/16 |
| 4,762,210 | 8/1988 | Boitani | 190/16 |
| 4,790,431 | 12/1988 | Reel et al. | 190/109 |
| 4,796,735 | 1/1989 | Horiuchi | 190/109 |
| 4,837,590 | 6/1989 | Sprague | 190/109 |
| 4,896,776 | 1/1990 | Kabanuk et al. | 206/576 |
| 5,002,184 | 3/1991 | Lloyd | 206/576 |
| 5,010,988 | 4/1991 | Brown | 190/104 |
| 5,105,338 | 4/1992 | Held | 190/109 |
| 5,109,961 | 5/1992 | Bergman | 190/109 |

*Primary Examiner*—Jimmy G. Foster
*Attorney, Agent, or Firm*—John E. Halamka

[57] ABSTRACT

A portable office carrying case having a base fabricated of ridged material and at least the front and back sides fabricated of ridged material to protect electronic equipment, such as a portable computer, placed within the case by the user to be moved and placed on a working surface. The sides between the front and back may be ridged or flexible to allow the expansion of the space within the case. At least the front ridged side is hinged to the base and detachable from the sides so that the user may lower the front side from a vertical position onto the working surface providing access to the keyboard of the computer at substantially the working surface level. A storage pocket may be attached to the outside of the back ridged side. A divider may be mounted inside the case to define compartments. Pockets may be mounted on the divider to allow the user to store office materials. A top is provided to close over the case. A carrying handle or strap is provided for the user to conveniently move the portable office. A storage pocket with closeable lid may be attached to the back ridged side.

14 Claims, 2 Drawing Sheets

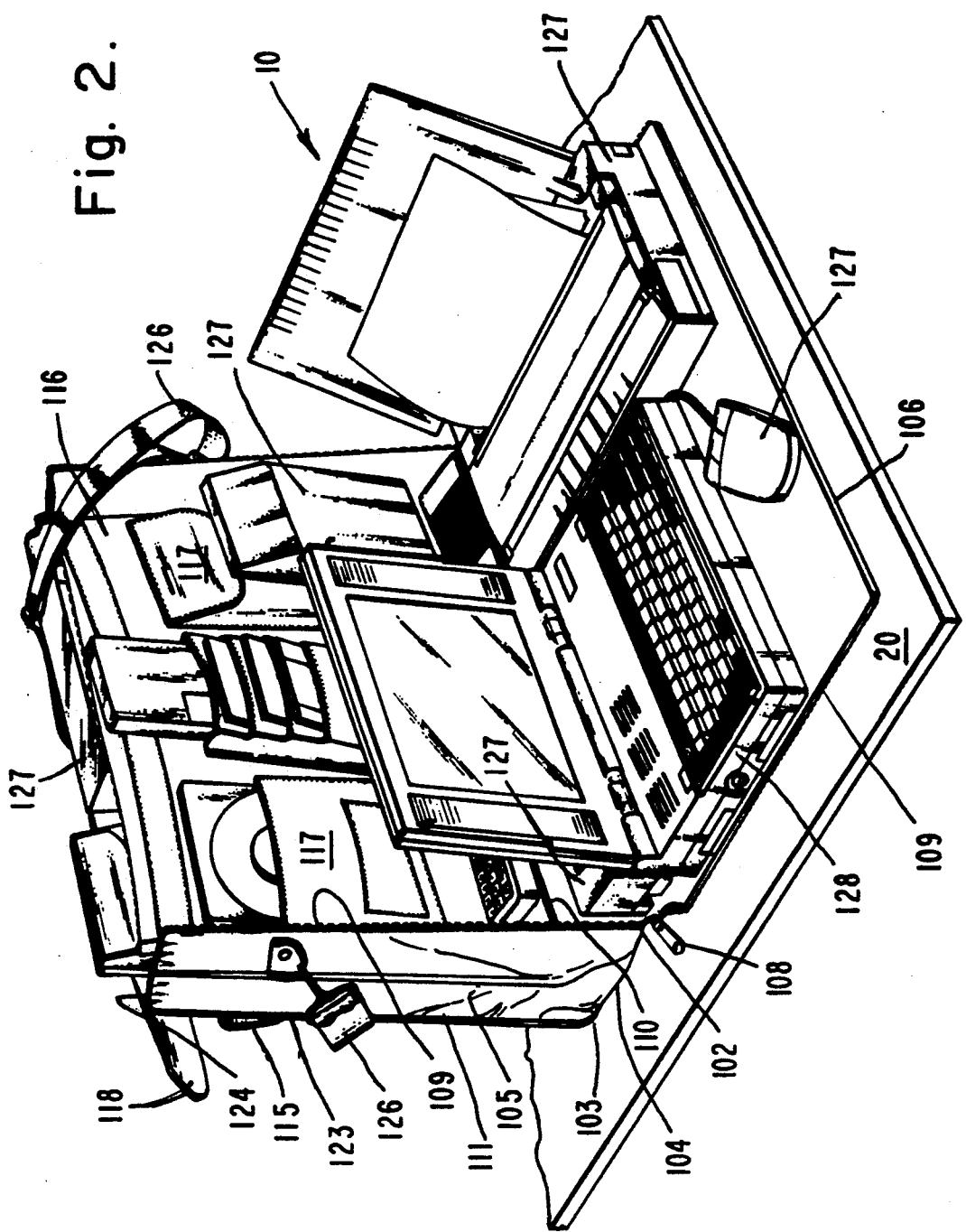

PORTABLE OFFICE

BACKGROUND OF THE INVENTION

1. Field of the Invention

This invention relates to a portable office incorporating a portable computer, printer, phone, related power supply and implements, and more particularly to an improved carrying case arrangement to protect, organize, and store all of the component parts for easy movement from place to place and easy set up at a user selected place.

2. Description of the Prior Art

Portable computers present a self contained unit including keyboard, memory, display and CPU. Some models include a modem to transfer data and fax information to telephone lines.

None of the models provide an integral printer device to provide a hard copy of compiled information for the user, such as a sales person, to present to a prospective customer.

Prior solutions are shown in one or more of the following U.S. Patents.

| | | |
|---|---|---|
| 4,790,431 | James W. Reel et al. | December 13, 1983 |
| 4,796,735 | Yutaka Horiuchi | January 10, 1989 |
| 4,837,590 | Glenn R. Sprague | June 6, 1989 |
| 5,010,988 | Lauren Brown | April 30, 1991 |

These attempts to solve the need for a portable office do not fulfill the entire needs.

The soft sided carrier fails to provide adequate protection for the electronic equipment while being transported from place to place. Sharp corners may push against the soft side and then against the equipment with a chance of damage to the electronics. Even the solutions with state of the art soft padding fail to provide the ridged surface required to dissipate the energy from the intense blow of a sharp object. Further, the closing means for soft sided carriers usually incorporate a zipper. The zippers, strained with the weight of the equipment and the stress of movement from place to place, usually fail. A catastrophic failure in the zipper may result in dumping the electronics onto the pavement or inadvertent loss of items in the carrier.

The prior art solutions incorporating a hard sided carriers protect the equipment but are configured to provide a raised platform for the computer and its keyboard. This raised position is exaggerated even more when the portable office is used on a desk. Because of the raised position the user has to reach over the edge of the carrier to access the keyboard. Because the keyboard is stationed in the rased platform above the surface of the desk, the use of the keyboard may inflict long term damage to the user in the form of Carpal Tunnel Syndrome.

Thus there has long been a need for an arrangement utilize a ridged protective case in a configuration which minimizes the height of the keyboard above the available work surface.

Further, it is also desired that, in order to allow convenient use of the portable office, the main body of the carrier should sit upright on the working surface so that the hinged side of the carrier, upon which the computer and keyboard are mounted, may be unlatched, dropped down onto the working surface whereby the user may access the keyboard at the level of the working surface. The upright portion of the portable office should be accessible to allow convenient use of the other items contained therein.

Further, it is also desired that, in order to allow easy movement from place to place, the material from which the portable office is fabricated be, of course, not only ridged (as a composite or layers) but also lightweight.

SUMMARY OF THE INVENTION

Accordingly, it is an object of the present invention to provide an improved arrangement of a ridged protective case for at least a computer and keyboard which minimizes the height of the keyboard above the available work surface upon deployment of the keyboard.

It is another object to allow convenient access to other items inserted into compartments of the portable office.

It is yet another object to fabricate the portable office from composite or layers of material to form ridged sheets to protect the items inserted into the device.

The above and other objects of the present invention are achieved, according to a preferred embodiment thereof, by providing an improved carrier fabricated of ridged sheet material covered on at least the outside by real leather or simulated leather material to provide protection of the equipment stored in the device yet provide an attractive and scuff resistant covering of the device.

BRIEF DESCRIPTION OF THE DRAWINGS

The above and other embodiments of the present invention may be more fully understood from the following detailed description, taken together with the accompanying drawing, wherein similar reference characters refer to similar elements throughout, and in which.

DESCRIPTION OF A PREFERRED EMBODIMENT

Figure 1:
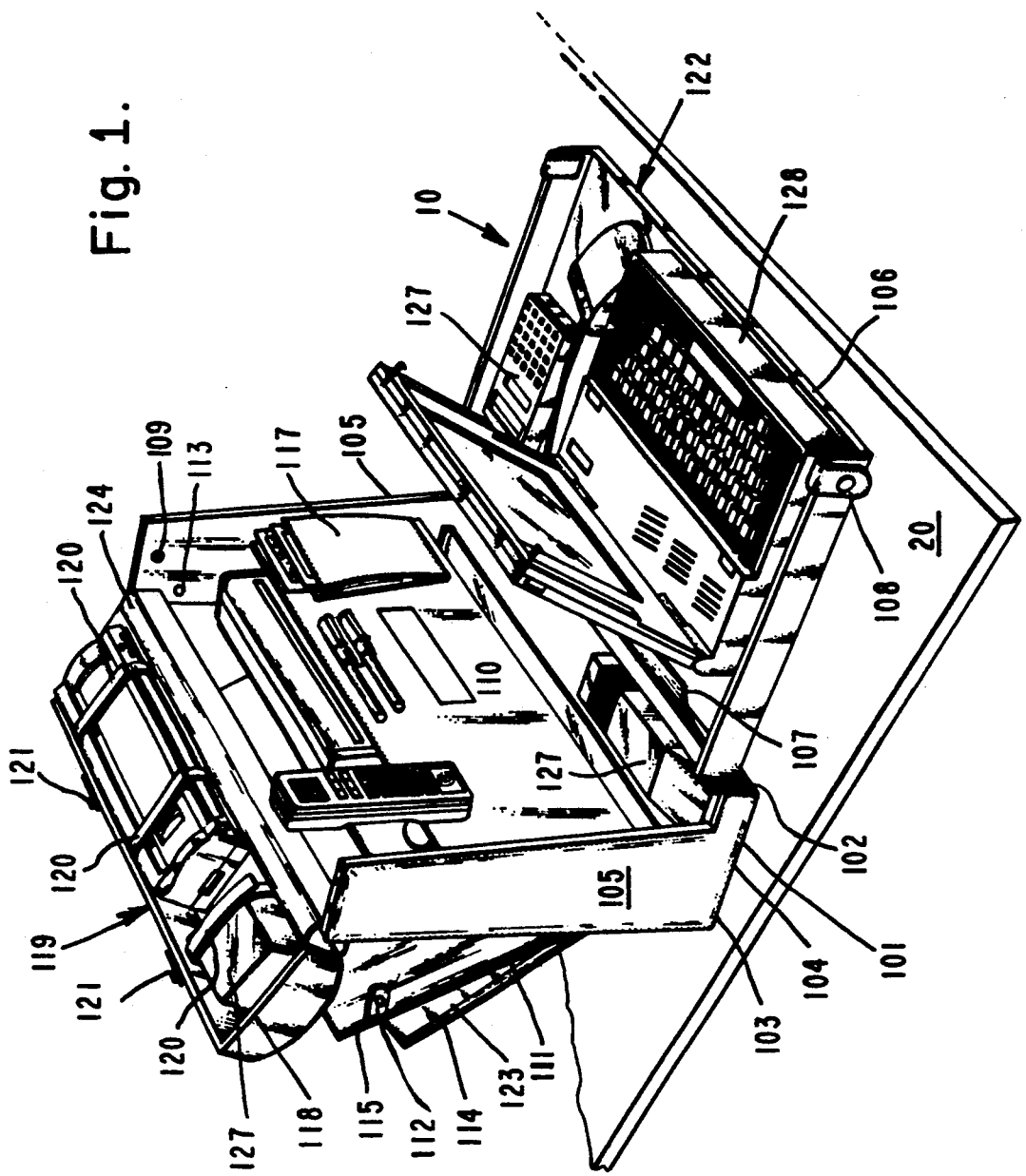
FIG. 1 represents a perspective view of an embodiment of the portable office device; and, FIG. 2 illustrates another embodiment of the present invention.

Referring now to the drawing, FIG. 1 shows the portable office, generally designated 10 according to the invention.

The preferred embodiment has a base 101 fabricated of ridged material in a generally rectangular shape. The edges of the base 101 may be turned up to form a front edge 102, a back edge 103 and a side edge 104 between the front edge 102 and the back edge 103. The base 101 provides a bottom platform which may be used as a tray to hold items convenient for the user of the portable office 10 such as a power supply into which electronic equipment in the office is connected. The power supply may have an AC cord which may be pulled out of the base 101 and plugged into a convenient AC outlet near where the user has placed the portable office 10 on a working surface generally designated as 20.

A side panel 105 is vertically mounted to each side edge 104, or may be fabricated as part of the base 101.

The side panels 105 may be fabricated of ridged material or flexible material. If flexible material is selected, the shape and dimensions of the flexible material may be selected to allow a fold to be formed in the side panel to allow the expansion of the side panel to increase the internal volume enclosed by the portable office 10 as shown in FIG. 2. A carrying strap 126 may be mounted to the side panels 105.

Now referring to FIG. 1, a first hard side 106, fabricated of ridged material in generally a rectangular shape, is hingedly mounted by one edge to the front edge 102. The first hard side 106 may be fabricated to have edges adjacent to the hinged edge turned to form a tray to prevent the electronic devices from slipping off the the sides of the first hard side 106.

The edge of the first hard side 106 mounted to the base 101 may be fabricated in the form of a lip 107 of a preselected size and shape to hold items such as a portable computer 128 secure between the top of the lip 107 and the surface of the first hard side 106. In the preferred embodiment, the portable office utilizes a light weight, compact computer such as a NOTEBOOK computer, the style and source being selected by the user.

The edge of the first hard side 106 remote from the hinged edge is fabricated to allow unobstructed access by the user to the keyboard of the portable computer 128. Hence, this edge may be straight or only slightly raised to assist in holding the portable computer 128 within the surface of the first hard side 106.

A first latch means 108 is mounted near the edge of the first hard side 106 and positioned to be engagable with the first catch means 109 mounted on each side panel 105 whereby the user may bring the first hard side 106 into proximity of the side panels 105 so that the first latch means 108 may be engaged with the first catch means 109 securing the first hard side 106 into a substantially vertical position for movement of the portable office 10 by the user.

The user may unlatch the first hard side 106 and move it into essentially a horizontal position in contact with the working surface 20 upon which the portable office 10 is placed.

A second platform 110 fabricated of ridged material in generally a rectangular shape may be mounted to the side panels 105 at a preselected distance above and essentially parallel to the base 101 to form a protective compartment for storage of selected office items. The second platform 110 may contain apertures, formed by first walls 125, to allow cabling to be installed in the portable office 10 by the user to electrically connect the portable computer 128 placed on the first hard side 106 with other equipment 127 placed in the portable office 10 such as a mouse, printer and modem.

A second hard side 111 is attached to the back edge 103 of the base 101. It may be hingedly attached to give the user access to the portable office 10 from both sides. If the second hard side 111 is hingedly attached, then latch means 112 may be mounted on the second hard side 111 in a position remote from the edge hingedly connected to the base 101 so that the user may move the second hard side 111 in proximity to the side panels 105 to engage the latch means 112 with the catch means 113 mounted on the side panels at a position remote from the base 101.

A storage pocket 114 may be sewn to the outside surface of the second hard side 111 with a "U" shaped stitching 123 so that the storage pocket 114 is accessible to the user when the second hard side 111 is latched to the side panels 105. The storage pocket material is fabricated of flexible material and has preselected dimensions larger than the dimensions of the second hard side 111 causing the storage pocket 114 to bulge outwardly from the second hard side 111 when it is attached. A lid 115 for the storage pocket 114 may be attached to the second hard side 111. A fastener in the form of a latch or slide fastener may be mounted on the edges of the pocket and lid to allow the user to securely store items in the storage pocket 114.

A divider panel 116 may be fabricated of ridged material and mounted between the side panels 105 in essentially a vertical position to divide the internal space between the first hard side 106 and second hard side 111 into two compartments.

A plurality of pockets 117 may be formed of flexible material and mounted on the divider panel 116. The size and shape of the pockets 117 are selected to accommodate office equipment such as floppy disks, pens, calculators, note pads, portable telephones, organizers, and the like selected by the user to be accessible when using the portable office 10.

The divider panel 116 may be mounted to each side panel 105 by a pivot hinge to allow the divider to be moved from its substantially vertical position to a substantially horizontal position when the first hard side 106 and second hard side 111 are moved from their essentially vertical position to essentially horizontal position.

A top 118 is hingedly mounted by a first edge 124 to the side panels 105. The top 118 may be fabricated of ridged or flexible material. A handle 119 is mounted on the outside surface of the top to allow the user to carry the portable office 10 from place to place.

The top 118 may be formed so that the inside surface is concave and of preselected dimension to accommodate certain office equipment 127 such as a printer or pager. A plurality of straps 120 may be attached to the concave side of the top 118 to securely hold the office items with the concave surface.

Second latch means 121 may be mounted on the top 118 and positioned to be engagable with second catch means 122 mounted on the first hard side 106 when the first hard side 106 is closed against the side panels 105.

Since certain change may be made in the above apparatus without departing from the scope of the invention herein involved, it is intended that all matter contained in the above description, as shown in the accompanying drawing, shall be interpreted in an illustrative, and not a limiting sense.

What is claimed is:

1. A portable office carrying case movable to a user selected work surface comprising:
   a base, fabricated of ridged material, forming a bottom platform of said case, having a front edge, a back edge and side edges there between;
   two side panels, each vertically mounted to one said side edge of said base;
   first catch means mounted on said side panels remote from said base;
   a first hard side hingedly attached by an edge to said front edge of said base and having first latch means mounted on said first hard side in a position remote from said base to removably attach said first hard side in substantially a vertical position to said first catch means;
   second catch means mounted on the outside surface of said first hard side at a position remote from said base;
   a lip mounted to said hinged edge of said first hard side to securely hold a user selected portable computer, having a keyboard and display, between said lip and said first hard side under the condition of the user moving said first hard side from engagement with said side panels to a position engaging said work surface and back into position to be engaged with said side panels;

a second hard side attached by an edge to said back edge of said base and having fastening means remote from said base to attach said second hard side in substantially a vertical position to both said side panels;

a top hingedly attached by a first edge to the ends of said side panels remote from said base;

second latch means mounted on said top remote from said first edge and positioned to be removably engagable with said second catch means; and, a divider panel, fabricated of ridged material, mounted to said two side panels in a substantially vertical position between said first hard side and said second hard side forming compartments with said case whereby, under the condition of said base being placed on said work surface and said first hard side unlatched from said side panels and lowered to said work surface, the keyboard of said portable computer being made accessed to said user at substantially the level of said work surface.

2. The portable office defined in claim 1 wherein said side panels are fabricated of ridged material.

3. The portable office defined in claim 2 further comprising a hinge to attach said second hard side to said back side of said base and wherein said fastening means comprises catch means mounted on said side panels remote from said base and latch means mounted to said second hard side in a position engagable with said catch means.

4. The portable office defined in claim 3 wherein said mounting of said divider panel to said side panels is a swivel at a preselected distance remote from said base whereby said divider panel may be turned substantially horizontal to said work surface under the condition of said first hard side and said second hard side unlatched from said side panels and moved into substantially horizontal position.

5. The portable office defined in claim 1 wherein said side panels are fabricated of flexible material.

6. The portable office defined in claim 5 wherein said side panels are fabricated with a expandable fold.

7. The portable office defined in claim 5 further comprising a carrying strap attachable to said side panels.

8. The portable office defined in claim 5 further comprising:

a storage pocket formed by pocket material having a U-shaped edge stitched to said second hard side, the transverse dimension of said pocket material being substantially greater than the transverse dimension of said U shaped stitching causing said storage pocket to bulge outwardly from said second hard side defining a wide opening;

a lid having one edge stitched to said second hard side adjacent said opening, said lid projecting outwardly from said second hard side; and, fastener means mounted on said lid and said storage pocket in a position to be engaged to close said storage pocket to secure items placed therein by the user.

9. The portable office defined in claim 1 wherein said base further comprising a second platform mounted by the ends to said side panels at a preselected distance remote from and substantially parallel to said bottom platform.

10. The portable office defined in claim 1 further comprising first walls forming apertures in said second platform whereby the user may install cables to electrically connect the user installed electronic equipment.

11. The portable office defined in claim 1 wherein said top is concave on the side facing said base and further comprises a plurality of detachable latchable straps whereby said user may mount preselected implements into said top being secured in place by said straps.

12. The portable office defined in claim 1 further comprising pockets mounted on said divider panel.

13. The portable office defined in claim 1 further comprising a handle mounted to the outside surface of said top.

14. The portable office defined in claim 1 further comprising:

a storage packet formed by pocket material having a U-shaped edge stitched to said second hard side, the transverse dimension of said pocket material being substantially greater than the transverse dimension of said U shaped stitching causing said storage pocket to bulge outwardly from said second hard side defining a wide opening;

a lid having one edge stitched to said second hard side adjacent said opening, said lid projecting outwardly from said second hard side; and, fastener means mounted on said lid and said storage pocket in a position to be engaged to close said storage pocket to secure items placed therein by the user.

* * * * *